US009773370B2

(12) United States Patent
Borissov et al.

(10) Patent No.: US 9,773,370 B2

(45) Date of Patent: Sep. 26, 2017

(54) METHOD AND SYSTEM FOR SYNCHRONOUS MOVEMENT OF GAMING MACHINES

(71) Applicants: Milo Borissov, Dubai Sports (AE); Rossi McKee, Indianapolis, IN (US)

(72) Inventors: Milo Borissov, Dubai Sports (AE); Rossi McKee, Indianapolis, IN (US)

( * ) Notice: Subject to any disclaimer, the term of this patent is extended or adjusted under 35 U.S.C. 154(b) by 175 days.

(21) Appl. No.: 14/608,568

(22) Filed: Jan. 29, 2015

(65) Prior Publication Data

US 2015/0243128 A1 Aug. 27, 2015

Related U.S. Application Data

(60) Provisional application No. 61/934,025, filed on Jan. 31, 2014.

(51) Int. Cl.
*G06F 17/00* (2006.01)
*G07F 17/32* (2006.01)

(52) U.S. Cl.
CPC ...... *G07F 17/3225* (2013.01); *G07F 17/3216* (2013.01)

(58) Field of Classification Search
USPC ...................................................... 463/40–42
See application file for complete search history.

(56) References Cited

U.S. PATENT DOCUMENTS

| | | | |
|---|---|---|---|
| 4,151,804 A | 5/1979 | Wache et al. | |
| 5,044,864 A | 9/1991 | Stefan | |
| 5,232,191 A | 8/1993 | Infanti | |
| D399,670 S | 10/1998 | Miller et al. | |
| 6,116,597 A | 9/2000 | Rowe et al. | |
| 6,514,145 B1 | 2/2003 | Kawabata et al. | |
| 6,637,844 B1 | 10/2003 | Luciano, Jr. et al. | |
| 6,646,695 B1 | 11/2003 | Gauselmann | |
| 6,646,995 B1 | 11/2003 | Le Strat et al. | |
| 6,702,093 B2 | 3/2004 | Lyon et al. | |
| D492,363 S | 6/2004 | Seelig et al. | |
| D492,364 S | 6/2004 | Seelig et al. | |
| D493,846 S | 8/2004 | Seelig et al. | |
| 6,854,715 B2 | 2/2005 | Hicks et al. | |
| 7,040,626 B2 | 5/2006 | Seelig et al. | |
| 7,494,418 B2 | 2/2009 | Rifkin et al. | |
| 7,545,108 B2 | 6/2009 | Flessas | |
| 7,775,888 B2 | 8/2010 | Wudtke | |
| 7,896,746 B2 | 3/2011 | Borissov | |
| 8,096,884 B2 * | 1/2012 | Beadell | G07F 17/32 463/46 |
| 8,210,949 B2 | 7/2012 | Graf | |
| 8,535,141 B2 * | 9/2013 | Rommerdahl | G07F 17/3209 463/16 |
| 2002/0060124 A1 | 5/2002 | Thompson | |
| 2003/0089577 A1 * | 5/2003 | Lyons | G07F 9/06 194/344 |
| 2004/0149866 A1 | 8/2004 | Boucher et al. | |
| 2005/0215325 A1 | 9/2005 | Nguyen et al. | |
| 2005/0277468 A1 | 12/2005 | Fitzsimons et al. | |
| 2006/0183544 A1 | 8/2006 | Okada | |

(Continued)

*Primary Examiner* — Ronald Laneau

(74) *Attorney, Agent, or Firm* — Weide & Miller, Ltd.

(57) ABSTRACT

The invention comprises methods and systems for moving gaming machines. Preferably, the positions of two or more movable gaming machines are controlled, such as to synchronously control their movement.

17 Claims, 4 Drawing Sheets

(56) References Cited

U.S. PATENT DOCUMENTS

| | | | |
|---|---|---|---|
| 2008/0100187 | A1 | 5/2008 | Tomasello et al. |
| 2009/0057504 | A1 | 3/2009 | Borissov |
| 2009/0209324 | A1 | 8/2009 | Graf |
| 2011/0275443 | A1 | 11/2011 | Cole et al. |
| 2012/0122569 | A1 | 5/2012 | Kowolik et al. |

* cited by examiner

METHOD AND SYSTEM FOR SYNCHRONOUS MOVEMENT OF GAMING MACHINES

RELATED APPLICATION DATA

This application claims priority to U.S. Provisional Patent Application Ser. No. 61/934,025, filed Jan. 31, 2014.

FIELD OF THE INVENTION

The present invention relates to casino-style gaming machines.

BACKGROUND OF THE INVENTION

A wide variety of casino-style gaming machines are known. These machines may offer many different games such as video poker, spinning reel slots and video slots, among other games. The machines may also have a wide variety of designs or appearances.

A single casino might have as many as 2000-4000 gaming machines on its floor. As a result, gaming machine manufacturers are constantly seeking new and exciting ways to attract players to their machines. Currently, gaming machines may use video presented on video displays thereof, exciting or loud sound or the like to attract players.

New and improved configurations for attracting player attention to gaming machines are desired.

SUMMARY OF THE INVENTION

Embodiments of the invention comprise methods and systems for moving gaming machines. Preferably, the positions of two or more movable gaming machines are controlled, such as to synchronously control their movement.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise methods and systems for moving gaming machines. Preferably, the positions of two or more movable gaming machines are controlled, such as to synchronously control their movement.

The systems and methods described herein are particularly applicable to gaming machines or devices. Such gaming machines may have various configurations.

The gaming machines may be located at a casino (and as such may be referred to as a "casino gaming machine"). As described below, the gaming machines may be part of a gaming system, such as a casino gaming system which links two or more of the gaming machines or one or more gaming machines with other devices, such as one or more table games, kiosks, accounting systems or servers, progressive systems or servers, player tracking systems or servers or the like.

Figure 1:
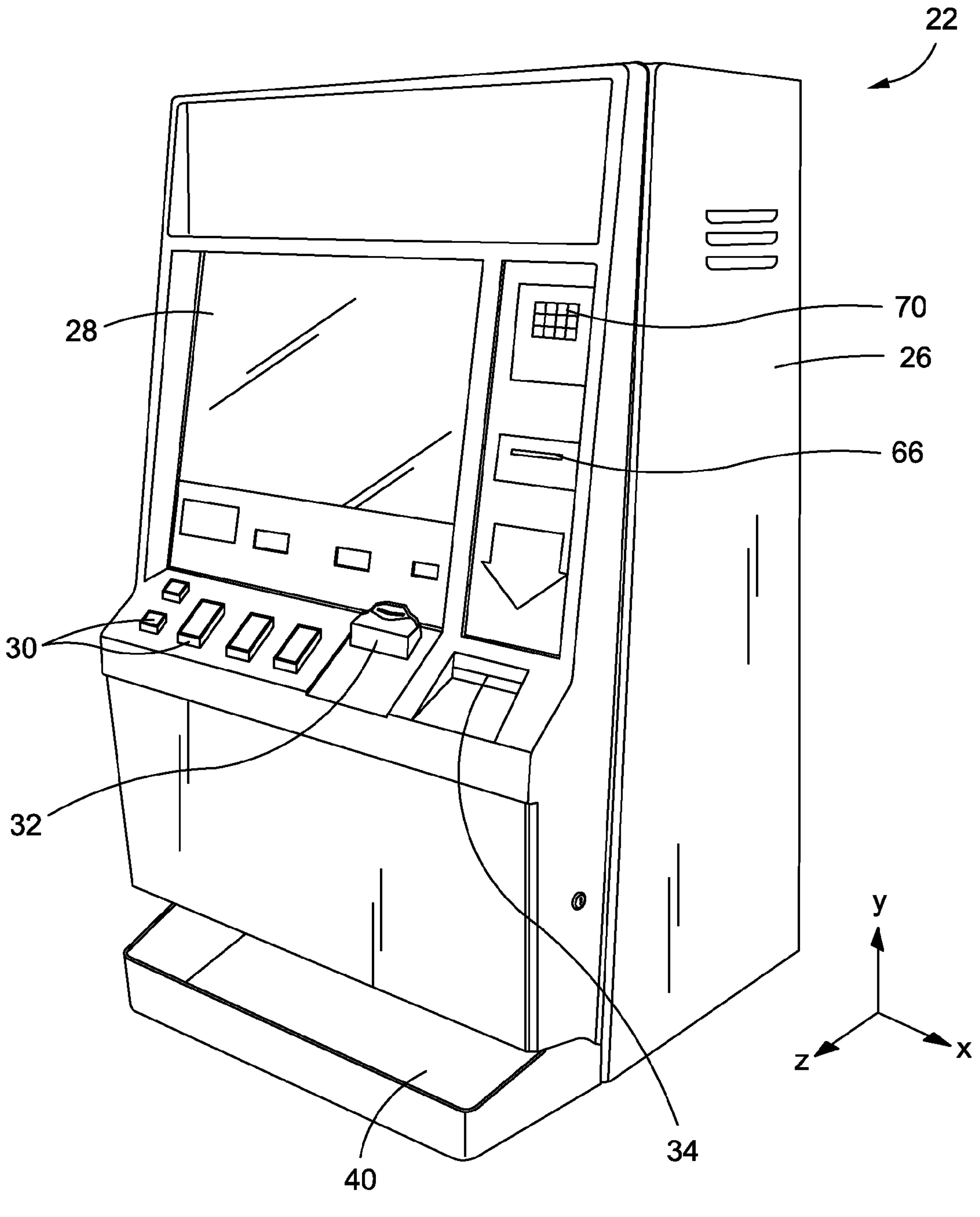
FIG. 1 illustrates an example of a gaming machine.

One configuration of a gaming machine 22 is illustrated in FIG. 1. As illustrated, the gaming machine 22 generally comprises a housing or cabinet 26 for supporting and/or enclosing various components required for operation of the gaming machine. In the embodiment illustrated, the housing 26 includes a door located at a front thereof, the door capable of being moved between an open position which allows access to the interior, and a closed position in which access to the interior is generally prevented. The configuration of the gaming machine 22 may vary. In the embodiment illustrated, the gaming machine 22 has an "upright" configuration. However, the gaming machine 22 could have other configurations, shapes or dimensions (such as being of a "slant"-type, "bar-top" or other configuration as is well known to those of skill in the art).

The gaming machine 22 preferably includes at least one display device configured to display game information. The display device may comprise an electronic video display 28 such as a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g. 4:3, widescreen or the like). The display 28 may be capable of projecting or displaying a wide variety of information, including images, symbols and other indicia or information associated with game play, game promotion or other events. The gaming machine 22 might include more than one display device 28, such as two or more displays 28 which are associated with the housing 26. The gaming machine 22 might also include a top box or other portion. Such a top box might include one or more display devices 28, such as in addition to one or more main displays which are associated with the housing 26. Also, the gaming machine 22 might include side displays (such as mounted to the exterior of the housing 26) and might include multiple displays of differing sizes.

In another embodiment, the display device might comprise gaming machine 22 may comprise or include one or more physical reels capable of displaying symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depression a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. As is well known, the combinations of reel positions and their odds of hitting are associated with the controller, and the controller is arranged to stop the reels in a position displaying a combination of indicia as determined by the controller based on the combinations and odds. The principal of such an arrangement is described in U.S. Pat. No. 4,448,419 to Telnaes, which is incorporated herein by reference. For example, the base symbols might be associated with spinning reels. Sets of base symbols might be generated by spinning those reels.

As described in more detail below, the gaming machine 22 is preferably configured to present one or more games upon a player making a monetary payment or wager. In this regard, as described in more detail below, the gaming machine 22 includes means for accepting monetary value.

In one embodiment, as detailed above, certain game outcomes may be designated as winning outcomes. Prizes or awards may be provided for winning outcomes, such as monetary payments (or representations thereof, such as prize of credits), or promotional awards as detailed herein. As detailed below, the gaming machine 22 includes means for returning unused monetary funds and/or dispensing winnings to a player.

The gaming machine 22 preferably includes one or more player input devices 30 (such as input buttons, plunger mechanisms, a touch-screen display, joystick, touch-pad or the like). These one or more devices 30 may be utilized by the player to facilitate game play, such as by providing input or instruction to the gaming machine 22. For example, such input devices 30 may be utilized by a player to place a wager, cause the gaming machine 22 to initiate a game, to indicate cards to be held or discarded, to "cash out" of the gaming machine, or to provide various other inputs.

In one preferred embodiment, the gaming machine 22 includes at least one microprocessor or controller for controlling the gaming machine, including receiving player input and sending output signals for controlling the various components of the machine 22 (such as generating game information for display by the display 28). The controller may be arranged to receive information regarding funds provided by a player to the gaming machine, receive input such as a purchase/bet signal when a purchase/bet button is depressed, and receive other inputs from a player. The controller may be arranged to generate information regarding a game, such as generating game information for display by the at least one display 28 (such as information representing images of displayed cards, slot symbols or the like), for determining winning or losing game outcomes and for displaying information regarding awards for winning game outcomes, among other things.

The controller may be configured to execute machine readable code or "software" or otherwise process information, such as obtained from a remote server. Software or other instructions may be stored on a memory or data storage device. The memory may also store other information, such as pay table information. The gaming machine 22 may also include one or more random number generators for generating random numbers, such as for use in selecting cards and for presenting the game in a random fashion.

Preferably, the controller is configured to execute machine readable code or instructions which are configured to implement the method of game play of the invention. For example, the controller of the gaming machine 22 may be configured to detect a wager, such as a signal from a player's depressing of the "bet one" button. Upon such an event and/or the player otherwise signaling the gaming machine to present the game, the controller may be configured to cause game information to be displayed on the at least one display 28. The controller may accept input from a player of selections or input via the one or more player input devices of the gaming machine 22.

The gaming machine 22 may be configured to generate and present games in a stand-alone manner or it may be in communication with one or more external devices at one or more times. For example, the gaming machine 22 may be configured as a server based device and obtain game code or game outcome information from a remote game server (in which event the gaming machine controller may receive game information from the server, such as game outcome information, and use that server-generated information to present the game at the gaming machine).

As indicated, the gaming machine 22 is configured to present one or more wagering games. Thus, the gaming machines 22 is preferably configured to accept value, such as in the form of coins, tokens, paper currency or other elements or devices representing value such as monetary funds. For example, as illustrated in FIG. 1, the gaming machine 22 might include a coin acceptor 32 for accepting coins. Of course, associated coin reading/verifying devices and coin storage devices may be associated with the gaming machine 22 if it is configured to accept coins. Likewise, the gaming machine 22 might include a media reader 34. Such a reader may be configured to accept and read/verify paper currency and/or other media such as tickets. Of course, in such event the gaming machine 22 may further be configured with one or more paper currency or ticket storage devices, such as cash boxes, and other paper currency or media handling devices (including transport devices).

The gaming machine 22 might also be configured to read FOBs, magnetic stripe cards or other media having data associated therewith and via which value or funds may be associated with the gaming machine 22.

In one embodiment, the gaming machine 22 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. For example, upon an award or at cash-out, associated funds may be paid to the player by the gaming machine 22 dispensing coins to a coin tray. In another embodiment, funds may be issued by dispensing paper currency. In yet another embodiment, a player may be issued a media, such as a printed ticket, which ticket represents the value which was paid or cashed out of the machine. The aspects of gaming machine "ticketing" systems are well known. One such system is described in U.S. Pat. No. 6,048,269 to Burns, which is incorporated herein in its entirety by reference.

The gaming machine 22 may also include a player tracking device, such as a card reader 66 and associated keypad 70. Such player tracking devices are well known and may permit the game operator to track play of players of the gaming machine. The tracked play may be utilized to offer player bonuses or awards.

It will be appreciated that the gaming machine illustrated in FIG. 1 is only exemplary of one embodiment of a gaming machine. For example, it is possible to for the gaming machine to have various other configurations, including different shapes and styles and having different components than as just described.

In one embodiment, the gaming machine 22 may be server-based. In such a configuration, a controller at a server may generate game information and transmit that information to a local controller at the gaming machine 22. The local controller at the gaming machine 22 may then cause game information to be displayed on one or more associated displays.

A casino may have numerous such gaming machines 22, such as located on a casino floor or in other locations. Of course, such gaming machines 22 might be used in other environments, such as an airport, a bar or tavern or other locations.

The gaming machines 22 may be configured to present a wide variety of games which are now known or later developed. Such games may include, but are not limited to: keno, bingo, video poker, spinning reel slots, video slots, blackjack, roulette and other games.

In accordance with the invention, the position or orientation of a gaming machine 22 may be changed. Preferably, as described herein, the position or orientation of two or more gaming machines 22 is controlled, such as to synchronously move or otherwise control the position of the gaming machines 22.

Various means may be provided for changing the position of a gaming machine 22. For example, a gaming machine 22 may be mounted on an adjustable support stand such as that illustrated and described in U.S. Pat. No. 7,896,746, which is owned by the applicant of this application and which is incorporated in its entirely by reference herein. As described therein, such a support stand may include one or more motors or other devices which are configured to change the position of the support stand, and thus a gaming machine 22 which is positioned thereon.

In other variations of the invention, gaming machines 22 may be configured to be moved in other manners. For example, instead of being mounted on an adjustable stand, a gaming machine 22 might include an integrated movable base or feet (such which can be extended or retracted to raise or lower the gaming machine).

Preferably, means are provided for independently changing the position of a gaming machine 22 (i.e. changing the position of each machine independently of another machine). However, gaming machines 22 could be configured to be moved with one another. For example, at a bank of four (4) gaming machines 22, pairs of the gaming machines 22 might be mounted on the same stand, whereby movement of each stand results in movement of the two gaming machines 22 associated with that stand.

The position or orientation of a gaming machine 22 of the invention might be changed in various manners, such as in as few as one degree of freedom, and as many as six degrees of freedom. For example, a gaming machine 22 might be configured to:

(1) Move side to side (such as along or parallel to an X axis as illustrated in FIG. 1);
(2) Move up or down (such as along or parallel to a Y axis as illustrated in FIG. 1):
(3) Move forward or back (such as along or parallel to a Z axis as illustrated in FIG. 1):
(4) Pivot, rotate or tilt (such as pivot, rotate or tilt about any of the X, Y or Z axes in FIG. 1);
(5) or move or rotate about any combination of one or more of the above.

Preferably, the gaming machines 22 are moved by one or more means for moving which may be electronically controlled. Such means for moving may comprise or include one or more electric motors. The control instructions might comprise power (such as power on or power off) or instructions which are used by a motor controller to cause the motor to operate. For example, a motor may have an associated controller which is configured to receive control instructions in the form of digital data and which uses those instructions to operate one or more switches. The one or more switches may cause the motor to operate at different speeds, in different directions, etc. Of course where the means for moving includes multiple motors, different instructions might be provided to different ones of the motors. For example, an adjustable stand might use one motor to raise and lower the stand and another to rotate or pivot the stand. A main controller may send instructions to a central motor controller which controls both of the motors or it might send instructions to a controller associated with each motor, whereby each motor is controlled.

Figure 2:
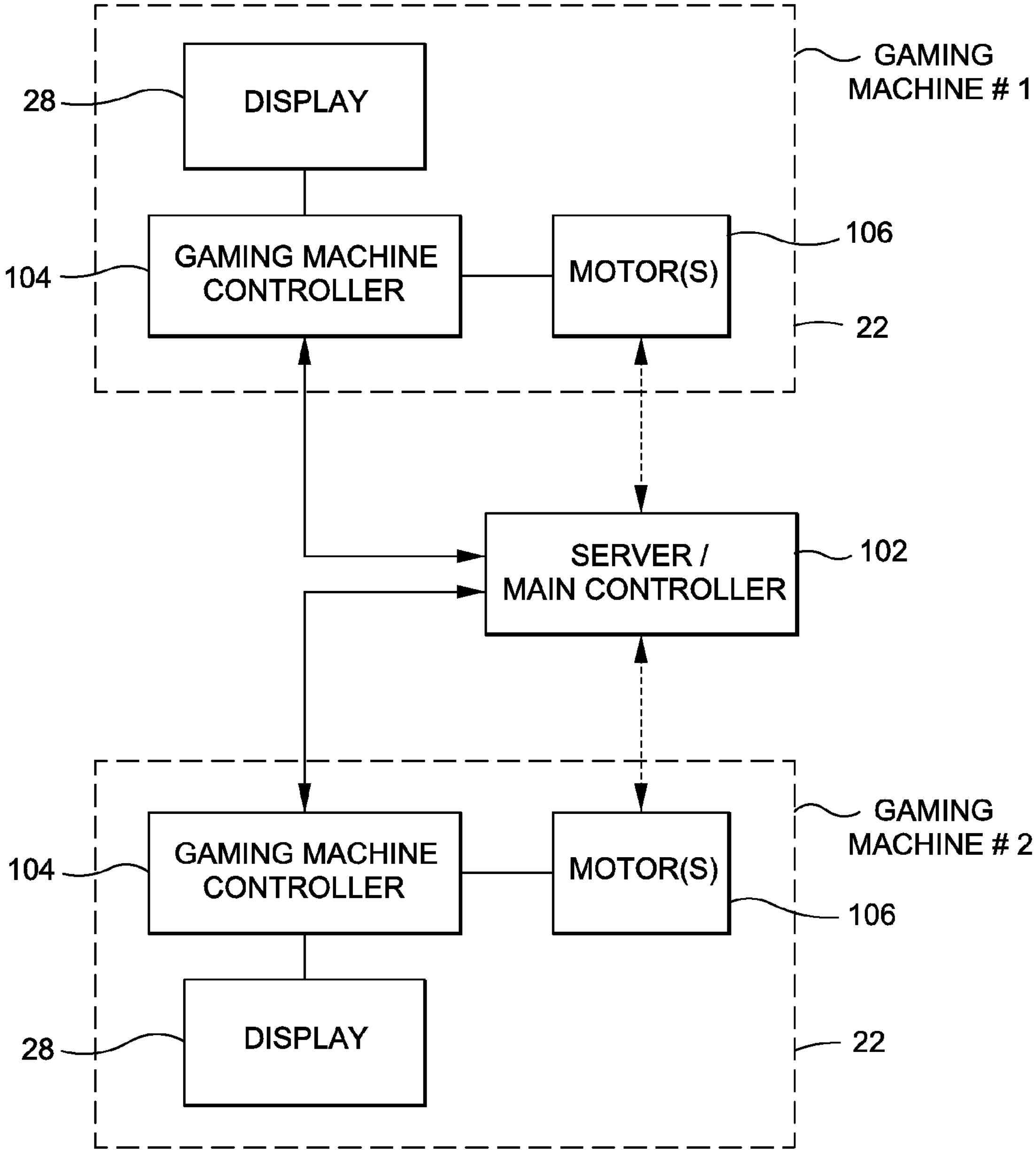
FIG. 2 schematically illustrates a system of the invention.

While U.S. Pat. No. 7,896,746 discloses a configuration of a support stand which permits a player to provide input to raise or lower a single gaming machine to a player-desired height, the present invention permits synchronous control and movement of multiple gaming machines. Referring to FIG. 2, one aspect of the invention is a system 100 by which the position of two more gaming machines 22 is commonly or centrally controlled. In one embodiment, such a system 100 may include a main controller 102 and two or more gaming machines 22.

The main controller 102 may comprise a wide variety of devices. For example, the main controller 102 might comprise a server or other computing device which comprises at least one processor for receiving information, for processing information or executing code or software, and for generating an output, such as control instructions.

In one embodiment, the main controller 102 includes means for storing information or instructions. Such means may comprise one or more memory devices. Such might comprise RAM, ROM (including EPROM, EEPROM, PROM) or other devices now known or later developed. The main controller 102 might include one or more other memory devices, such as for storing game state information or the like, as detailed below. In one embodiment, the main controller 102 might comprise or be in communication with one or more mass data storage devices, such as one or more hard drives or the like.

The main controller 102 preferably also includes at least one communication interface, by which it may exchange (i.e. receive and/or transmit) information with another device (such as a gaming machine 22, motor or motor controller and/or other devices). The communication interface(s) may permit communications in accordance with various protocols (TCP/IP, 802.11xx, etc.) and in various forms and over various types of links (wired and/or wireless).

The main controller 102 might actually comprise a system or network of a plurality of elements or devices. For example, the main controller 102 might comprise a network or system which includes multiple servers and related devices such as data storage devices, user interface features and the like. Such might comprise, for example, a user station which includes a video display and one or input devices (such as a keyboard, mouse or the like). Such a user station may permit an operator to interface with and manage or control the main controller 102, such as to change operator settings and the like. The main controller 102 might also comprise a router and one or more separate computing devices. The functions of the various computing devices might be segregated.

In one embodiment, the main controller 102 is configured to generate position instructions. Such instructions may be utilized to control or change the position of one or more gaming machines 22. For example, as illustrated in FIG. 2, the control instructions may be sent to the gaming machine controller 104 of each gaming machine 22. The gaming machine controller 104 of each gaming machine 22 may then re-transmit those instructions or utilize those instructions to one or more associated means for moving, such as one or more motors 106 (or an associated motor controller). Of course, in an alternate embodiment, the main controller 102 might transmit control instructions directly to the one or more means for moving, such as the one or more motors 106 (or an associated motor controller).

In another embodiment, position or control instructions might be generated remotely and then be uploaded to the system, such as the main controller 102. For example, a control sequence might be pre-programmed and that program information might be uploaded to the main controller 102 which executes or otherwise utilizes that program information to execute the desired movement of the gaming machines.

Preferably, the main controller 102 is configured to generate control instructions for controlling the position of two or more gaming machines 22. Such instructions may be configured to cause two or more gaming machines 22 to be moved synchronously, i.e. the position of two or more gaming machines 22 is simultaneously controlled.

In one embodiment, the main controller 102 might be located in a casino's control room or back room, or at least a user interface thereto might be so located, whereby a casino remotely controls gaming machines on its floor. In other embodiments, the main controller 102 might be located at or adjacent to a specific bank of two or more gaming machines 22 on the floor. In the former case the main controller 102 might be used to control a multitude of gaming machines in different locations across a gaming floor. In the latter case, a main controller 102 might be associated with a particular group or bank of gaming machines.

Figure 3A:
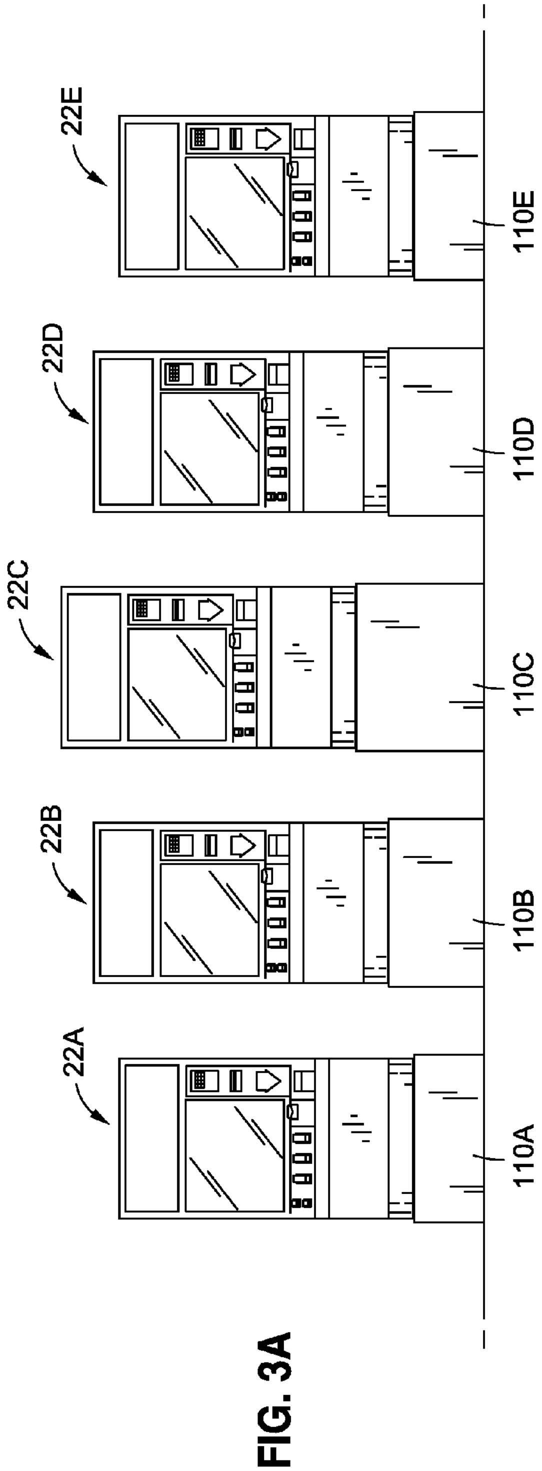
FIGS. 3A and 3B illustrate one example of movement of a plurality of gaming machines in accordance with the present invention.

One example of a method of the invention will be described with reference to FIGS. 3A and 3B. As illustrated in FIG. 3A, five gaming machines 22A-E are mounted on associated stands 110A-E. Each stand 110A-E may be height adjustable, such as described above.

As illustrated in FIG. 3A, the main controller 102 may transmit instructions which cause the first and fifth stands 110A,110E to be moved to or maintained in a lowered position. The main controller 102 may transmit instructions which cause the second and fourth stands 110B,110D to move to an intermediate raised position, and to cause the middle or third stand 110C to move to a fully raised position. Of course, the position or height of each gaming machine 22A-E is dependent upon the position of its stand.

Figure 3B:
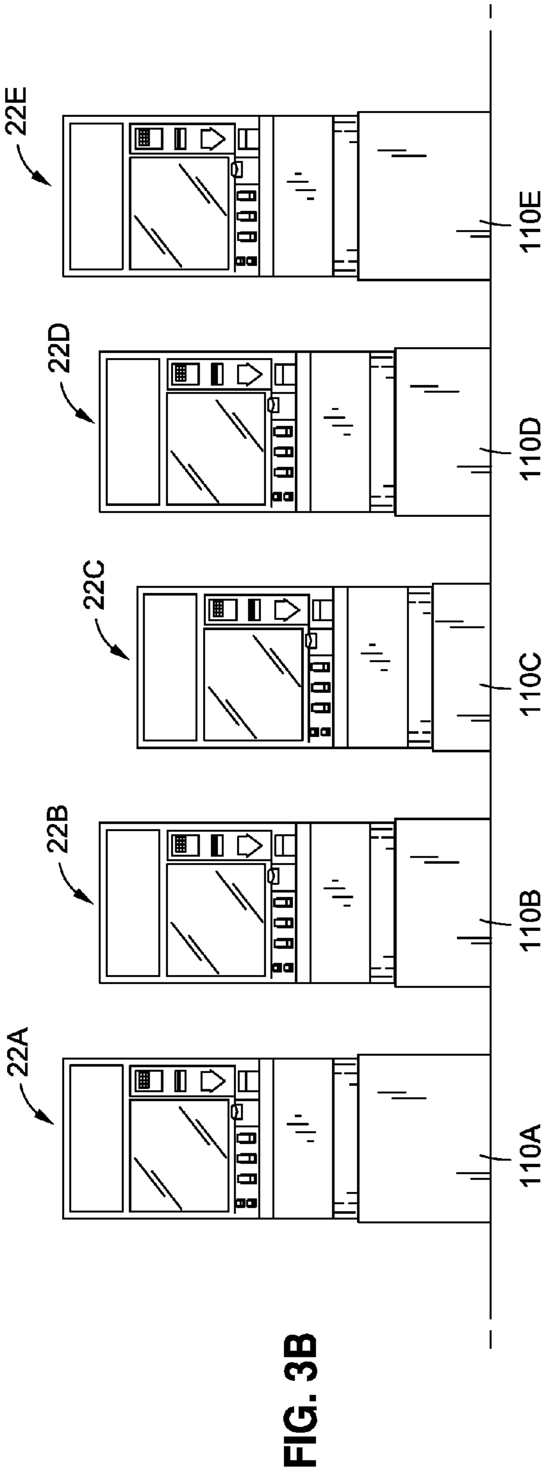

As illustrated in FIG. 3B, the main controller 102 may generate and transmit instructions which cause the position of each stand 110A-E to change, thus causing the position of the gaming machines 22A-E to change. In this example, the middle stand 110C has been moved from its raised to its lowered position, the first and fifth stands 110A,E have been moved from their lowered to their raised position, and the second and fourth stands 110B,D have been retained in their intermediate position.

Figure 4A:
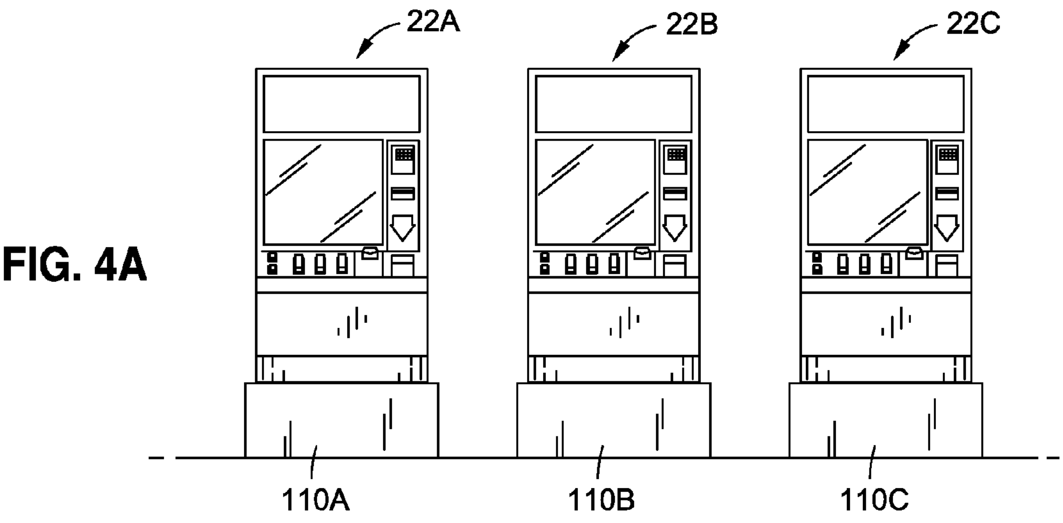
FIGS. 4A, 4B and 4C illustrate another example of movement of a plurality of gaming machines in accordance with the present invention.
Figure 4B:
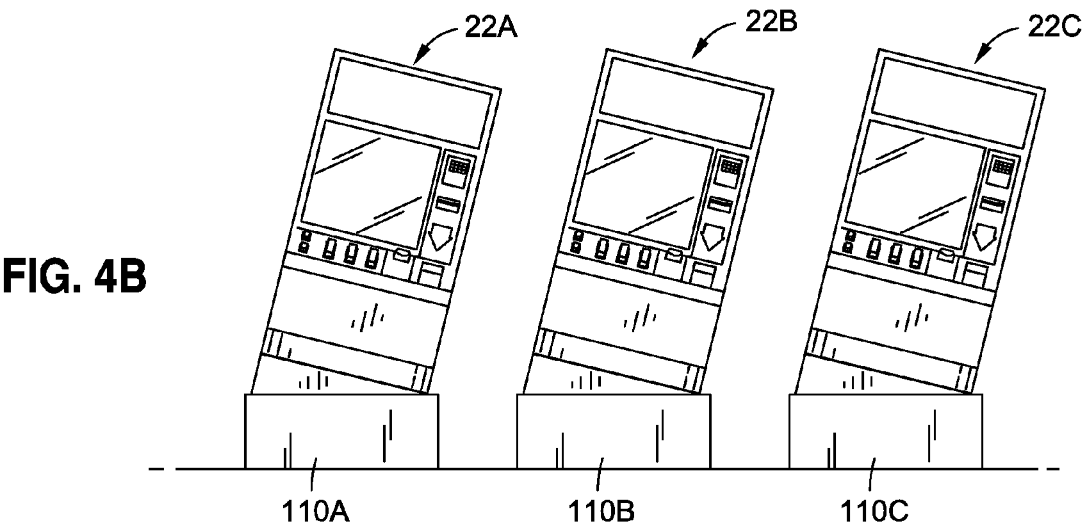
Figure 4C:
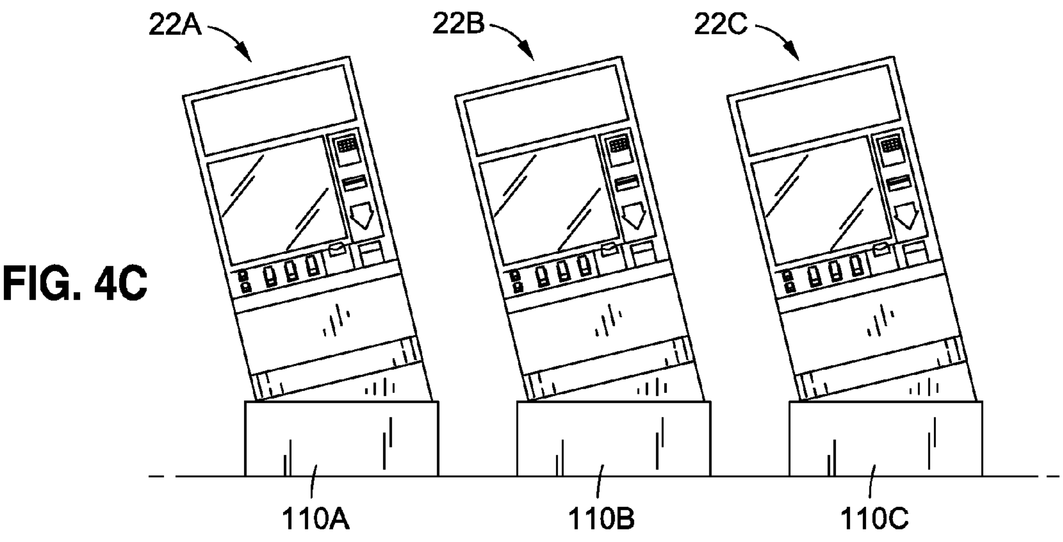

Another example of the invention is illustrated in FIGS. 4A-4C. In this example, the positions of multiple gaming machines are changed by tilting them from side to side. For example, the gaming machines might be moved from a generally vertical position (as illustrated in FIG. 4A), to a position where they are tilted to the right (as illustrated in FIG. 4B), to a position in which they are tilted to the left (as illustrated in FIG. 4C).

As indicated, in some embodiments the positions of some, but not all, of the gaming machines may be changed at any given time. For example, as illustrated in FIGS. 3A and 3B, the positions of the end and center gaming machines 22A, 22C and 22E are changed while the positions of the second and fourth gaming machines 22B, 22D are not.

In accordance with the invention, the positions of the gaming machines may be changed continuously or at certain times. For example, the position of a gaming machine might be changed from position A to position B and then the position of the gaming machine might remain static at position B for some time. In another embodiment, the position of the gaming machine might be changed from position A to position B and then back to position A, and so on, in relatively continuous movement.

In one embodiment, the main controller 102 might cause the gaming machines 22 to be moved based upon certain criteria, such as triggers or the like. For example, in a preferred embodiment, the position of a gaming machine might only be changed when the gaming machine is not in use. As one example, the controller of a gaming machine might send an "idle mode" notice to the main controller 102 when the gaming machine is not in use for some period of time. The main controller 102 might then cause the gaming machine to be moved.

In another example where gaming machines are located adjacent to one another or in "banks", the positions of the gaming machines might not be changed unless all of the gaming machines are not in use.

Of course, the gaming machines might be moved based upon other criteria. For example, if a player of one of the machines of a bank receives a particular outcome, such as a jackpot winning outcome, the main controller 102 might cause one or more of the gaming machines to move.

The gaming machines 22 might be moved to set or designated positions (such as a raise position, a lowered position and/or an intermediate position) or a range of positions (such as a relatively infinite number of positions between a lowered and a raised position). Also, the gaming machines 22 might be placed into motion and not stop at a designated position. For example, a gaming machine 22 might be moved upwardly from a lowered position and upon reaching a designated height, immediately move back downwardly.

As one aspect of the invention, the positions of two or more gaming machines are synchronously controllable (i.e. the positions of the two or more gaming machines are controlled such that one may be moved and not the other or both may be moved, such as in unison). This control allows the gaming machines to be moved in various manners, such as in entertaining and exciting patterns. For example, as illustrated in FIGS. 3A and 3B, a series of gaming machines might be raised and lowered to simulate a "wave" effect. As illustrated in FIGS. 4A-4C, a series of gaming machines might be moved so that they appear to "sway" back and forth. Of course, the gaming machines might be moved in any of a variety of manners. For example, the gaming machines might be pivoted or rotated in unison or in sequence (in the same or different direction). As indicated herein, a gaming machine operator (such as a casino) might program the main controller to cause the gaming machines to move various desired manners (i.e. independent of player control). While the gaming machines 22 might be moved to create a particular pattern, they might be moved randomly.

In accordance with the invention, a system is configured to control the position of multiple gaming machines. Using such a system, gaming machines may be moved, such as to create exciting visual effects. These visual effects may be used to attract players to the gaming machines. Alternatively, the gaming machines might be moved to signal winning events or otherwise add to the excitement of play of the machines.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of moving gaming machines comprising:

sending control instructions from a controller to a least a first gaming machine and a second gaming machine, the controller being communicatively coupled to the first and second gaming machines, and each of the first and second gaming machines comprises at least one actuator to move the first and second gaming machines in at least one degree of freedom; and in response to the control instructions, the actuators causing said at least one first gaming machine and said second gaming machine to change positions relative to one another wherein if the first gaming machine is in use by a player, then the first gaming machine is not moved, and if the second gaining machine is in use by a player, then the second gaming machine is not moved.

2. The method in accordance with claim 1 wherein said first gaming machine and said second gaming machine move vertically up or down.

3. The method in accordance with claim 1 wherein said first gaming machine and said second gaming machine move synchronously.

4. The method in accordance with claim 3, wherein the first and second gaming machines are configured to be raised and lowered to simulate a wave effect.

5. The method in accordance with claim 3, wherein the first and second gaming machines are configured to move so as to appear to sway back and forth.

6. The method in accordance with claim 1 wherein the actuator of each first and second gaming machines comprises a separate moveable stand, each first gaming machine and second gaming machine is being mounted on a the separate movable stand, and said step of causing said gaming machines to change positions comprises changing a height of said stands.

7. The method in accordance with claim 1, wherein the first and second gaming machines are configured to move in at least one of a vertical direction, a horizontal direction, or a rotational direction.

8. The method in accordance with claim 1, wherein if one of the first or second gaming machines is in use, then none of the first and second gaming machines are moved.

9. A method of moving gaming machines comprising:

sending control instructions from a controller to a least a first gaming machine and a second gaming machine, the controller being communicatively coupled to the first and second gaming machines, and each of the first and second gaming machines comprises at least one actuator to move the first and second gaming machines in at least one degree of freedom; and in response to the control instructions, the actuators causing said at least one first gaming machine and said second gaming machine to change positions relative to one another wherein if a player on one of the first and second gaming machines receives a predetermined game outcome, then the controller sends control instruction to move at least one of the first and second gaming machines.

10. A gaming system comprising:

a first gaming machine;

a first means for actuator configured to move moving said first gaming machine;

a second gaming machine;

a second means for moving actuator configured to move said second gaming machine; and a controller comprising a processor and at least one memory, said controller configured to generate and send movement instructions to said the first and second means for moving actuators in order to move said first and second gaming machines, wherein the controller is configured to receive information from the first and second gaming machines regarding an idle mode of the first and second gaming machines, the controller only sends the movement instructions to move the first gaming machine when the controller receives information that the first gaming machine is in the idle mode, and the controller only sends the movement instructions to move the second gaming machine when the controller receives information that the second gaming machine is in the idle mode.

11. The gaming system according to claim 10, wherein the first actuator comprises a first moveable stand one which the first gaming machine is mounted, and the second actuator comprises a second moveable stand on which the second gaming machine is mounted.

12. The gaming system according to claim 10, wherein the first gaming machine and the second gaming machine are moved synchronously.

13. The gaming system according to claim 12, wherein the first and second gaming machines are moved to simulate a wave effect.

14. The gaming system according to claim 12, wherein the first and second gaming machines are moved to sway back and forth.

15. The gaming system according to claim 10, wherein the controller only sends the movement instructions to the first and second gaming machines when the controller receives information that the first and second gaming machines are both in the idle mode.

16. The gaming system according to claim 10, wherein the first and second actuators are configured to move the first and second gaming machines in a vertical direction.

17. The gaming system according to claim 10, wherein the first and second actuators are configured to move the first and second gaming machines in at least one of a vertical, horizontal, or rotational direction.

* * * * *